July 17, 1951 — C. W. WAHL — 2,560,613
COUPLING DEVICE
Filed Nov. 15, 1946 — 3 Sheets-Sheet 1
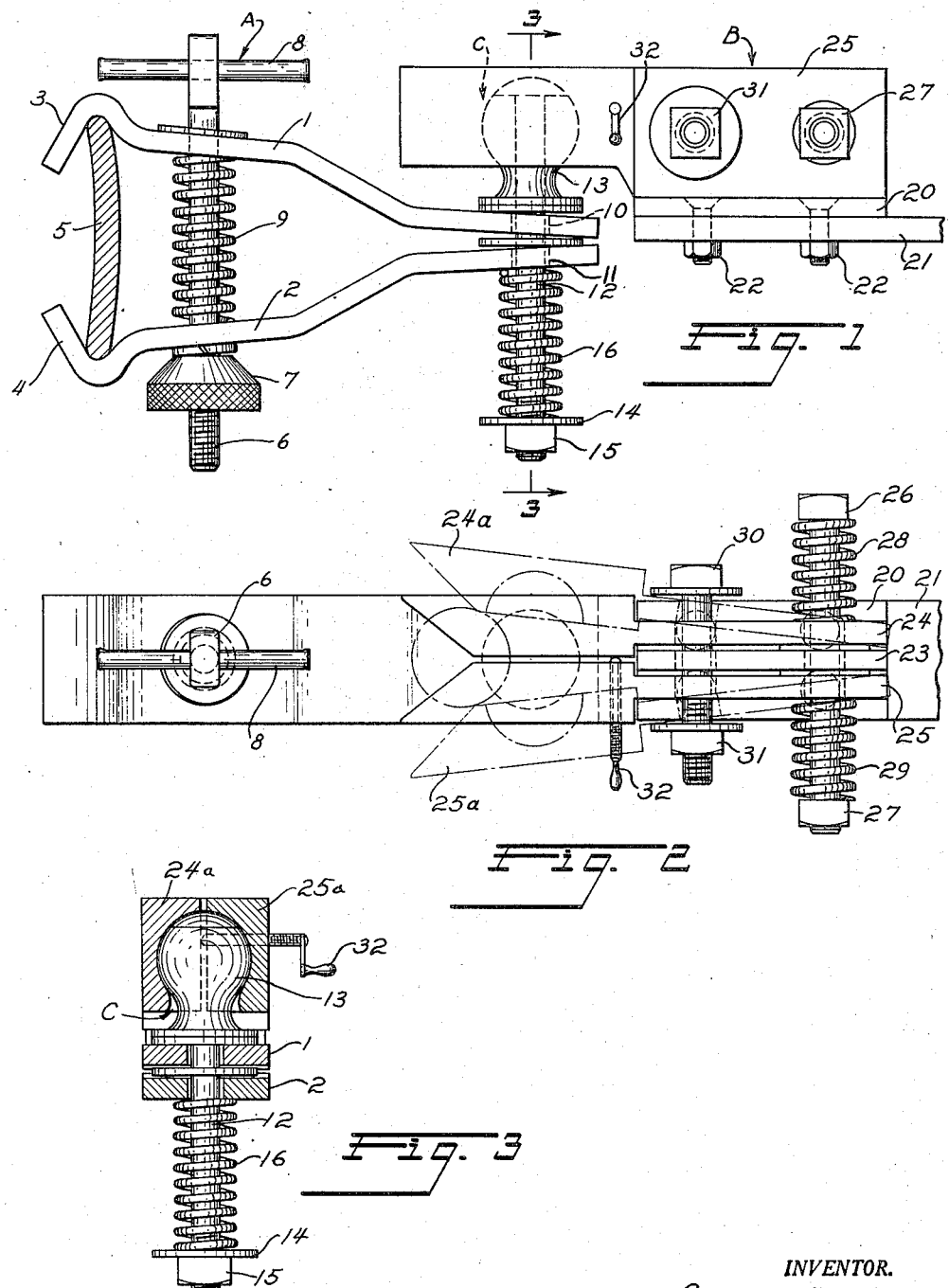
INVENTOR.
CARLETON W. WAHL
BY
Scrivener & Parker
ATTORNEYS July 17, 1951 C. W. WAHL 2,560,613
COUPLING DEVICE
Filed Nov. 15, 1946 3 Sheets-Sheet 2
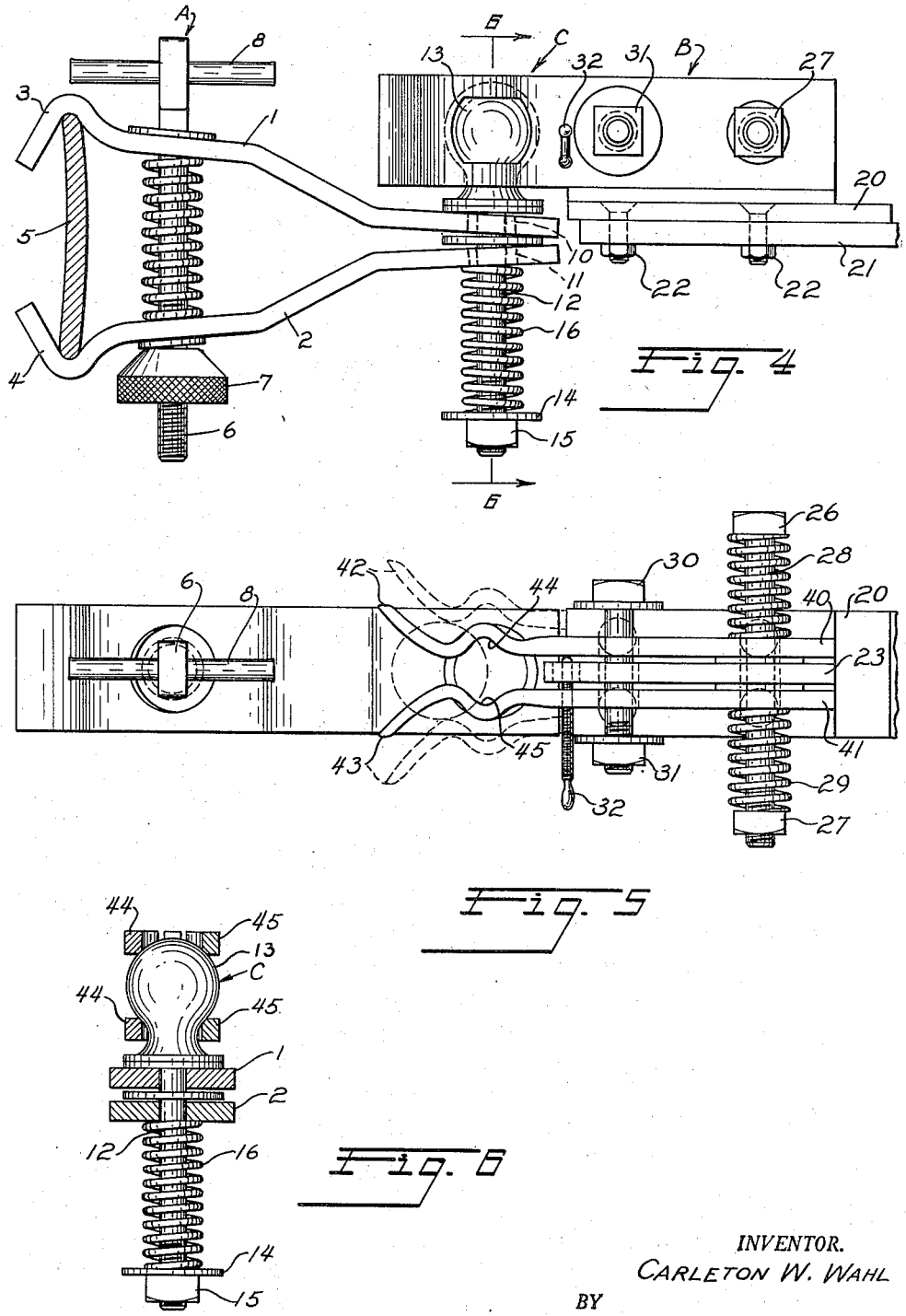
INVENTOR.
CARLETON W. WAHL
BY
Scrivener & Parker
ATTORNEYS July 17, 1951
C. W. WAHL
COUPLING DEVICE
2,560,613
Filed Nov. 15, 1946
3 Sheets-Sheet 3
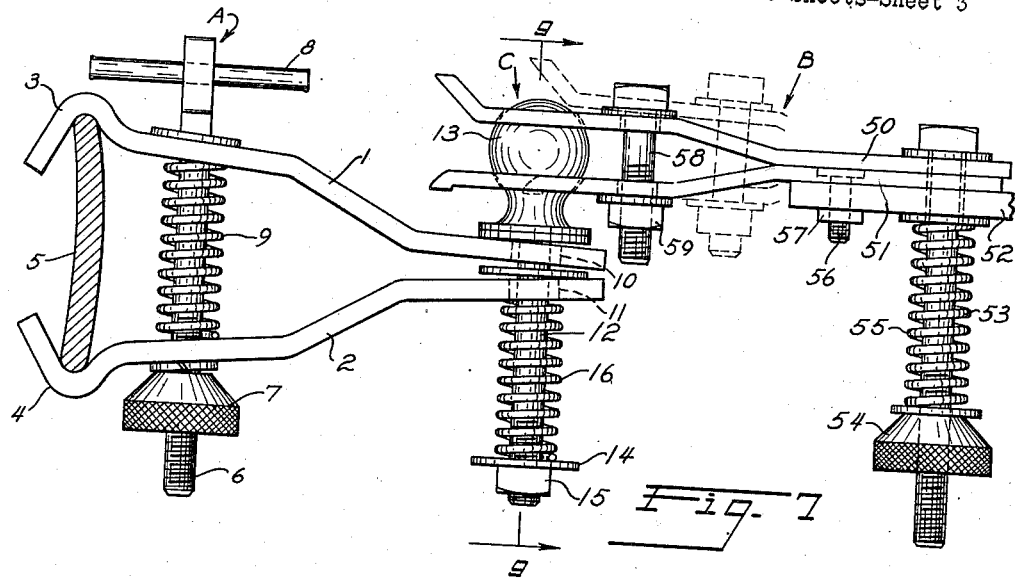
Fig. 7
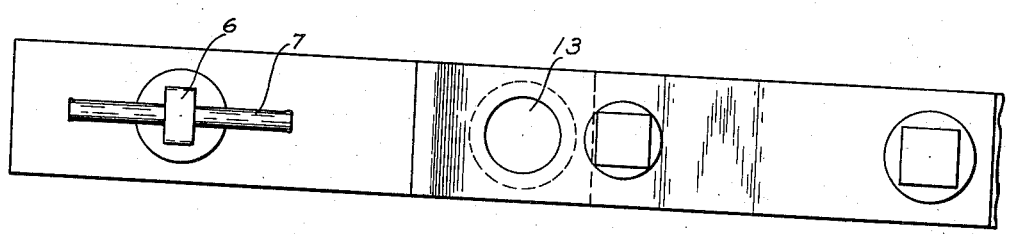
Fig. 8
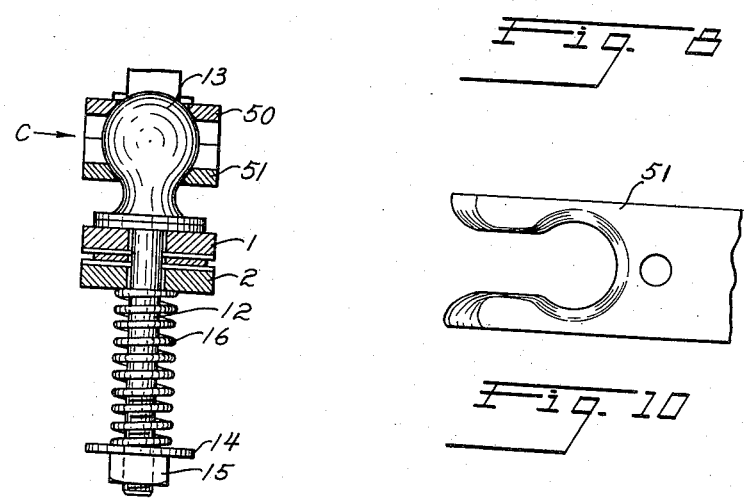
Fig. 9
Fig. 10
INVENTOR.
CARLETON W. WAHL
BY
Scrivener & Parker
ATTORNEYS Patented July 17, 1951

2,560,613

UNITED STATES PATENT OFFICE 2,560,613

COUPLING DEVICE

Carleton W. Wahl, Silver Spring, Md.

Application November 15, 1946, Serial No. 709,969

6 Claims. (Cl. 280—33.17)

This invention relates, in general, to coupling devices for attaching one vehicle to another so that the forward vehicle may tow the rear vehicle and, more particularly, to coupling devices of the type having parts adapted to be connected to the towing and trailing vehicles and which are connected by a ball and socket joint.

It has been found by long experience that coupling devices of the ball and socket type have a major disadvantage, which is that the ball is often broken from its support by unusual relative lateral or vertical movement of the vehicles which are connected by the coupling device. This defect results from the manner in which the ball is attached to its support. It is, therefore, a principal object of this invention to provide a towing device of the type having a ball and socket joint in which the ball is resiliently mounted to permit universal movement thereof under normal or abnormal driving conditions.

It is also well known to users of coupling devices of the ball and socket type that it is extremely difficult to open and close the socket as there is no flexibility between the parts of the socket and all adjustments must be made manually. It is, therefore, a further object of the invention to provide a socket, to be used in conjunction with a ball, in which the parts are resiliently urged together and into engagement with the ball and in which no manual operation need be performed to open or close the socket to receive or release the ball.

Other objects and features of novelty of the invention will be made apparent by the following description and the annexed drawings which, it will be understood, are only illustrative of my invention and impose no limitation thereon not imposed by the appended claims.

Referring to the drawings, in which similar reference numerals refer to like parts, Fig. 1 is a side view of my improved trailer coupling;

Fig. 2 is a top plan view thereof;

Fig. 3 is a sectional view taken on the lines 3—3 of Fig. 1;

Fig. 4 is a side view of my trailer coupling disclosing a modification of the socket;

Fig. 5 is a top plan view thereof;

Fig. 6 is a sectional view taken on the lines 6—6 of Fig. 4;

Fig. 7 is a side view of a second modification of the socket;

Fig. 8 is a top plan view thereof;

Fig. 9 is a sectional view taken on the lines 9—9 of Fig. 7, and

Fig. 10 is a detail view of part of the socket disclosed in Fig. 7.

The embodiment of my invention disclosed in Figs. 1, 2 and 3 comprises a clamping member A which is adapted to be attached to a towing vehicle and a clamping member B which is adapted to be attached to the towed vehicle, these members being connected by a ball and socket connection C.

The clamping member A comprises upper and lower plates 1, 2 which are respectively provided at their forward ends with downwardly and upwardly extending flanges 3, 4 forming lateral grooves adapted to receive the upper and lower edges of the rear bumper 5 of the towing vehicle. The plates 1, 2 of the clamping member A are held in place on the bumper 5 by means of a vertical bolt 6 which extends through vertically aligned apertures in plates 1, 2 and is provided externally of one of the plates with a nut 7 whereby the two plates may be drawn tightly against the bumper. If desired, a handle 8 may be projected through the head of the bolt to facilitate turning of the bolt. Between the two plates a compression spring 9 surrounds the bolt 6 and urges the plates apart as the nut 7 is loosened. The rear ends of the plates 1, 2 are positioned closely together and are provided with vertically aligned enlarged apertures 10, 11 through which a bolt 12 of less diameter than the apertures 10, 11 is projected, for a reason which will be made apparent hereinafter, the bolt 12 having a ball 13 at its upper end above the upper plate 1. The lower end of the bolt is provided with a washer 14 and a nut 15 and between the washer and lower plate 2 a compression spring 16 surrounds the bolt and constantly urges the rear ends of the plates 1, 2 together and holds the ball 13 resiliently against the upper surface of the upper plate 2.

The clamping member B comprises a horizontal plate 20 which is adapted to rest on the upper surface of the tongue 21 of the towed vehicle and to be permanently attached thereto as by bolts 22. Along the longitudinal center line of the base plate there is a vertical wall 23 which extends forwardly to the front end of the tongue of the towed vehicle and of base plate 20. The clamping device B itself comprises two identical parts 24, 25 each of which has a rear vertical wall part extending parallel to and on one side of the central wall and each having a forward part 24a, 25a which is wider than the rear wall part, the forward parts being slightly separated, the purpose of which will be made apparent hereinafter.

The plates 24, 25 are held in position adjacent the wall 23 by means of a bolt 26 which extends through horizontally aligned apertures in the rear section of wall 23 and parts 24, 25, one end of the bolt being provided with a nut 27. Two compression springs 28, 29 surround the respective ends of the bolt and urge the wall 23 and parts 24, 25 together as the nut is tightened. A second bolt 30 extends through horizontally aligned apertures formed in the forward section wall 23 and plates 24, 25 and is provided with nut 31, for a reason which will be made apparent hereinafter. A semi-spherical opening is provided in each enlarged forward section 24a, 25a, the two parts together defining a socket for the ball. A screw threaded crank 32 extends through one of the enlarged forward parts of the clamping device B, the inner end of the crank abutting the inner wall of the second enlarged part for a reason to be made apparent hereinafter. The forward ends of the enlarged parts 24a, 25a are V-shaped in cross section to provide easy ingress of the ball in the socket.

In operation, the clamping member A is attached to the rear bumper of the towing vehicle and the clamping member B is attached to the towed vehicle. The towing vehicle is then backed toward the towed vehicle directing the ball into the V-shaped inlet. The parts 24, 25 are thereby separated and the ball moves into the socket. Lateral displacement of the parts 24, 25 is opposed by the force of the springs 28, 29 and when the ball is positioned in the socket the springs force the parts together and effectively hold the ball in the socket. After the ball is positioned in the socket the nut 31 is tightened thereby providing a safety lock for the parts. The bolt 30 also relieves bolt 26 from the entire pulling force exerted by the towing vehicle. Vertical displacement of the ball is prevented due to the clamping action of the lower portions of the socket which extend around the bottom surface of the ball as shown clearly in Fig. 3. When it is desired to disconnect the vehicles, nut 31 is loosened and crank 32 is turned to separate the parts 24, 25. The towing vehicle can then pull away from the trailer, the ball sliding out of the socket.

Through the use of spring 16 complete flexibility of the ball is provided. The danger of the ball snapping from the bolt 12 is reduced to a minimum due to the action of the spring. Vertical movement of the ball is permitted as is complete lateral movement. As the apertures 10, 11 through which the bolt 12 is projected are of substantially greater diameter than the bolt, the bolt may move to a considerable angle without endangering the parts. In such action, the movement is resisted by the spring 16 which tends to move the bolt to its normal vertical position.

It has been found that after a long period of use the socket tends to become enlarged due to wear. This can be compensated for by tightening the nut 31 after the members are coupled to close the space between the enlarged forward ends of parts 24, 25.

The embodiment of my invention shown in Figs. 4, 5 and 6 is a modification of the clamping member B in which the structure of the parts 24, 25 has been changed. As disclosed in these figures the clamping device comprises two identical parts 40, 41 each of which has a rear vertical wall part extending parallel to and on one side of the central wall and each having a forward part comprising an outwardly flared portion 42, 43, each flared portion being connected to the rear part by a pair of vertically spaced concave straps 44, 45. The socket is defined by the rear edge of each flared portion, the inner edges of the straps and the forward edge of each of the parts 40, 41, all of the edges being curved to conform to the curvature of the ball 13.

It will be apparent that the mode of operation for this type of clamping member is similar to that disclosed hereinbefore.

In the embodiment of my invention disclosed in Figs. 7 to 10, inclusive, an additional modification of clamping device B is shown. In this modification the clamping member comprises two rearwardly converging horizontally disposed plates 50, 51, the bottom plate 51 resting on the upper surface of the tongue 52 of the towed vehicle. The two plates 50, 51 are held in position on the tongue 52 by means of a bolt 53 which extends through vertically aligned apertures in the plates and the tongue of the towed vehicle, one end of the bolt being provided with a nut 54. A spring 55 surrounds the bolt and urges the plates and tongue together as the nut 54 is tightened. A second bolt 56 in provided for attaching plate 51 to the tongue 52, the head of the bolt resting in a counter-sunk recess in the upper surface of plate 51, the nut 57 securing the plate and tongue together. Vertically aligned holes are provided in the forward section of the two plates through which a bolt 58 extends, a nut 59 being provided on the lower portion of the bolt, for a reason which will be made apparent hereinafter. In the forward section of the upper plate 50 an aperture is provided which is adapted to receive the upper portion of the ball 13. The lower plate 51 is bifurcated at its forward end, as shown in Fig. 10, to receive the lower portion of the ball 13, the enlarged inner portion of the opening formed therein being rounded to conform to the curvature of the ball.

In operation, when it is desired to attach the towing vehicle to the towed vehicle, the nut 59 on bolt 58 is loosened to permit the two bars 50, 51 to be spread apart. The automobile having the clamp A attached thereto is backed toward the trailer in such a manner that the ball 13 is directed into the bifurcated portion of the lower bar. After the ball has been projected inwardly a sufficient distance the upper surface of the ball engages the opening in the upper bar 50. During this entire operation the two bars are constantly being urged together by the spring 55 and the separation of the plates as the ball moves rearwardly is opposed thereby. After the ball is positioned in the opening in the upper bar 60 the spring urges the inner edges of the bifurcated portion of plate 51 into contact with lower surface of the ball, thereby preventing withdrawal of the ball. After the coupling is firmly attached to the ball the nut 59 is tightened to firmly lock the ball in the socket. To disconnect the vehicles, the nut 59 is loosened and the towing vehicle moved away from the towed vehicle.

Various other changes, as will now appear to those skilled in the art, may be resorted to without departing from the spirit of the invention. Reference will therefore be had to the appended claims for a definition of the limits of the invention.

I claim:

1. A connecting member for use in a vehicle coupling device of the type having a ball connected to a towing vehicle, said member comprising a base plate, a vertically disposed wall connected with said plate, a pair of flat vertically disposed plates on either side of the wall, said plates having enlarged forward portions in face-to-face relation, each enlarged portion being formed with an opening, said openings cooperating to form a socket for the ball, and means associated with the plates and vertical wall for yieldingly clamping the plates together.

2. A device for coupling two vehicles together to cause one to be towed by the other, comprising a first connecting member formed at one end thereof for attachment to the towing vehicle and formed at its other end with an aperture, a bolt extending through said aperture and being of less diameter than said aperture and having a ball at its upper end, resilient means normally maintaining said ball adjacent the upper surface of the first member and permitting vertical movement of the ball with respect thereto, a second connecting member formed at one end thereof for attachment to the towed vehicle, said second connecting member comprising a base plate, a vertically disposed wall connected with said plate, a pair of flat plates disposed on either side of the wall, said plates having enlarged forward portions in face-to-face relation, each enlarged portion being formed with a semi-spherical opening, said openings cooperating to form a socket for the ball, and a bolt which extends through horizontal apertures in the plates and vertical wall, said bolt having a spring mounted on each of the opposite ends thereof, said springs adapted to abut the outer faces of the plates and yieldingly clamp the plates and vertical wall together.

3. A coupling device according to claim 1 comprising, in addition, a threaded crank extending through one of the enlarged head portions, the inner end of the crank abutting the inner face of the second enlarged head portion and adapted to spread the head portions apart to release the ball from the socket.

4. A coupling device according to claim 1 comprising, in addition, means associated with the plates and the vertical wall for positively locking them together.

5. A coupling device as defined in claim 1 comprising, in addition, means carried by one of the plates for spreading the head portions apart to release the ball from the socket.

6. A coupling device according to claim 1, in which the forward ends of the enlarged parts of the plates are V-shaped in cross-section to provide easy ingress of the ball into the socket.

CARLETON W. WAHL.

REFERENCES CITED

The following references are of record in the file of this patent:

UNITED STATES PATENTS

| Number | Name | Date |
|---|---|---|
| 1,335,211 | Walker | Mar. 30, 1920 |
| 1,400,402 | Anderson | Dec. 13, 1921 |
| 1,909,917 | Hover | May 16, 1933 |
| 1,978,859 | Draeger | Oct. 30, 1934 |
| 2,078,851 | Hovey | Apr. 27, 1937 |
| 2,088,153 | Draeger | July 27, 1937 |
| 2,250,661 | Thorp et al. | July 29, 1941 |
| 2,429,544 | Bennett | Oct. 21, 1947 |
| 2,448,311 | Hill | Aug. 31, 1948 |

FOREIGN PATENTS

| Number | Country | Date |
|---|---|---|
| 716,719 | France | Dec. 26, 1931 |
| 734,381 | France | Oct. 21, 1932 |
| 626,106 | Germany | Feb. 20, 1936 |
| 449,481 | Great Britain | June 29, 1936 |